(12) United States Patent
Lee et al.

(10) Patent No.: US 8,180,775 B2
(45) Date of Patent: May 15, 2012

(54) COMPUTER-IMPLEMENTED METHOD FOR CLUSTERING DATA AND COMPUTER-READABLE MEDIUM ENCODED WITH COMPUTER PROGRAM TO EXECUTE THEREOF

(75) Inventors: Hong-Chien Lee, Jhongli (TW); Chih-Hao Chen, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 196 days.

(21) Appl. No.: 12/821,562

(22) Filed: Jun. 23, 2010

(65) Prior Publication Data

US 2011/0320445 A1    Dec. 29, 2011

(51) Int. Cl.
*G06F 7/00* (2006.01)
(52) U.S. Cl. ...................................................... 707/737
(58) Field of Classification Search ................. 707/737, 707/747
See application file for complete search history.

*Primary Examiner* — Truong Vo
(74) *Attorney, Agent, or Firm* — Thomas, Kayden, Horstemeyer & Risley, LLP

(57) ABSTRACT

Inferences acquired by applying clustering analysis cannot be reliably assessed before data-originated errors are quantified, an exacting task that is often not performed. This invention presents a clustering method suited for this purpose. Designed for systems with normally distributed error, a common trait to many data systems, and built on a framework of agglomerative hierarchical clustering, this invention treats each observation as a Gaussian distribution function, uses an exact mathematical relation to track error, and gives results from which quantitative statistics are easily extracted.

28 Claims, 1 Drawing Sheet

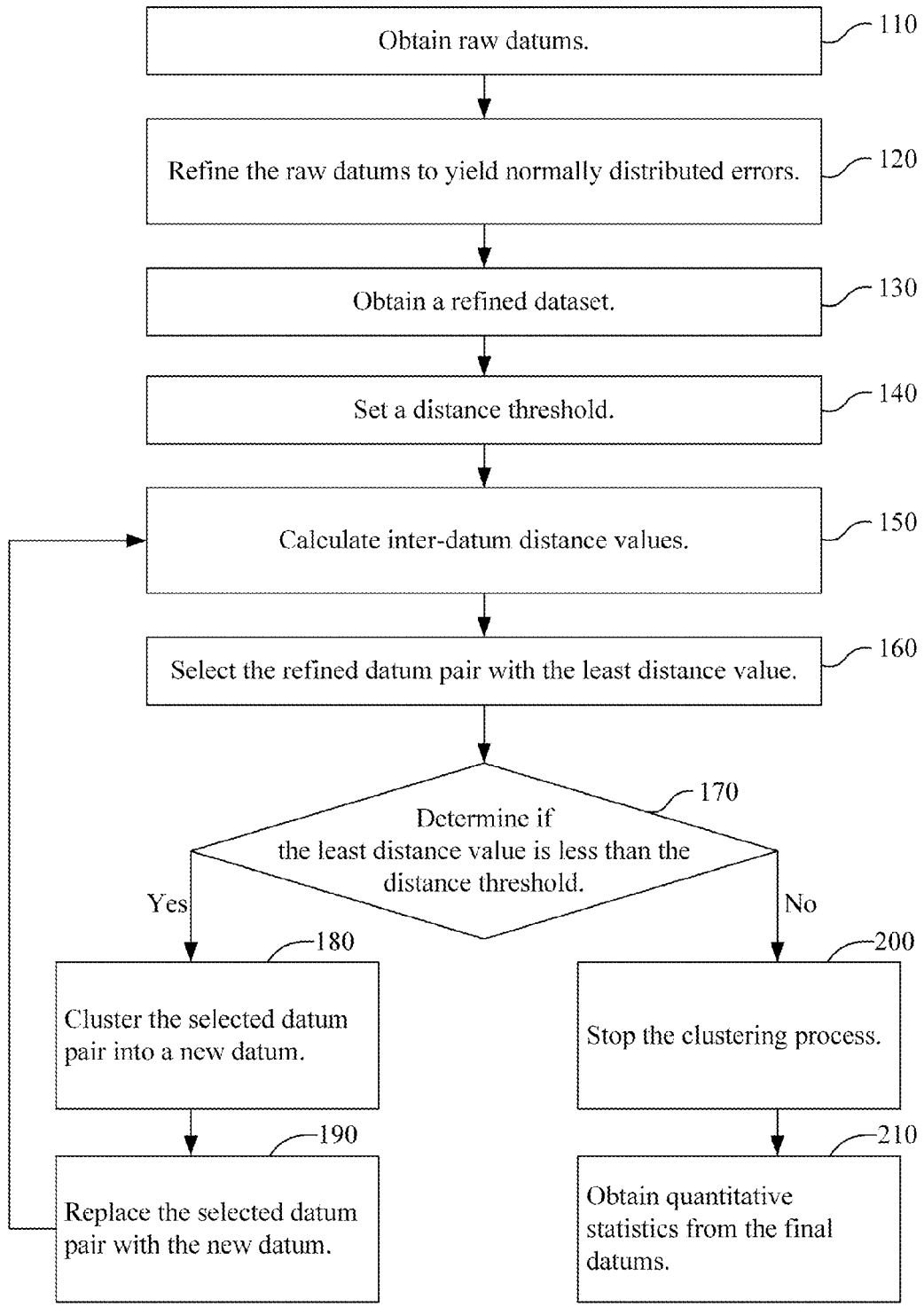

COMPUTER-IMPLEMENTED METHOD FOR CLUSTERING DATA AND COMPUTER-READABLE MEDIUM ENCODED WITH COMPUTER PROGRAM TO EXECUTE THEREOF

BACKGROUND

1. Technical Field

The present invention relates to a data processing method and a computer-readable medium encoded with a computer program to execute thereof. More particularly, the present invention relates to a method for clustering data and a computer-readable medium encoded with a computer program to execute thereof.

2. Description of Related Art

In statistics, hierarchical clustering is a method of cluster analysis which seeks to build a hierarchy of clusters. Strategies for hierarchical clustering generally fall into two types: (1) Agglomerative. This is a "bottom up" approach where each observation starts in its own cluster, and pairs of clusters are merged as one moves up the hierarchy. (2) Divisive. This is a "top down" approach where all observations starts in one cluster, and splits are performed recursively as one moves down the hierarchy.

In order to decide which cluster should be combined (for agglomerative), or where a cluster should be split (for divisive), a measure of dissimilarity between sets of observations is required. In most methods of hierarchical clustering, this is achieved by use of an appropriate metric (a measure of distance between pairs of observations), and linkage criteria, which specifies the dissimilarity of sets as a function of pairwise distances of observations in the sets. Some commonly used metrics for hierarchical clustering are: Euclidean distance, squared Euclidean distance, Manhattan distance, maximum distance, Mahalanobis distance and cosine similarity. The linkage criteria determine the distance between sets of observations as a function of the pair-wise distances between observations. Some commonly used linkage criteria between two sets of observations are Maximum or complete linkage clustering, Minimum or single-linkage clustering, and Mean or average linkage clustering.

Although an abundance of metrics and linkage criteria exist, none is designed for tracking error in the process of clustering—an exacting task essential for improving accuracy and for quantitatively assessing is data-originated uncertainty.

SUMMARY

This invention relates to a technique which allows error of data to be tracked and exploited throughout the process of clustering.

One embodiment of this invention is a computer-implemented method for clustering data. The computer-implemented method for clustering data is executed as follows. The raw datums are first refined to make errors normally distributed. Each refined datum has a refined mean and a refined variance. A plurality of refined distance values of refined datum pairs are calculated. Each of the refined datum pairs is formed by two of the refined datums. The refined distance value of each of the refined datum pairs is calculated using the refined means and the refined variances of the two refined datums which form the refined datum pair. The refined datum pair with the least distance value is selected and clustered into a new datum. The clustered refined datums which form the selected refined datum pair are replaced with the new datum.

Another embodiment of this invention is a computer-readable medium which is encoded with a computer program to execute the method for clustering data. The computer-implemented method for clustering data is executed as follows. The raw datums are first refined to yield normally distributed error. Each refined datum has a refined mean and a refined variance. A plurality of refined distance values of refined datum pairs are calculated. Each of the refined datum pairs is formed by two of the refined datums. The refined distance value of each of the refined datum pairs is calculated using the refined means and the refined variances of the two refined datums which form the is refined datum pair. The datum pair with the least distance value is selected and clustered into a new datum. The clustered refined datums which form the selected refined datum pair are replaced with the new datum.

Above all, in a clustering process, the present invention takes into consideration normal distribution of error for better accuracy. It results in simple formulation and, for its predictions, it provides statistical insight which facilitates implementation of quantitative statistics.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 1 is a flowchart of the computer-implemented method for clustering to data according to an embodiment of the present invention.

DETAILED DESCRIPTION

The theory of this invention is described in the following. Given a measured value v, the conditional probability (CP) for its true value being y is $Pr(y|v)=Pr(y \cap v)/Pr(v)$. Similarly, given a set of independently measured values $\Omega=\{v_i | i=1, \ldots w\}$ we have $Pr(y|\Omega)=Pr(y \cap \Omega)/Pr(\Omega)$, and from the independence of events, $Pr(y \cap \Omega)=\Pi_{i=1}^{w} Pr(y \cap v_i)$, and $Pr(\Omega)=\Pi_{i=1}^{w} Pr(v_i)$. Therefore, $Pr(y|\Omega)=\Pi_{i=1}^{w} Pr(y|v_i)$. For continuous variables, in terms of probability density function (PDF), the last equation becomes $d(y|\Omega) \propto \Pi_{i=1}^{w} d(y|v_i)$. Given that measurement errors are normally distributed, we approximate $d(y|v_i)$ by the Gaussian distribution function (Gaussian) $G(y;v_i,\sigma_i^2)=(2\pi\sigma_i^2)^{-1/2}\exp((y-v_i)^2/(2\sigma_i^2))$, where $\sigma_i^2$ is the variance for $v_i$ which is either known or estimated from $\Omega$. Because the product of two Gaussians is proportional to another Gaussian, we have $G_i G_j \propto G(y;\mu_k,\sigma_k^2)$, $\sigma_k^{-2}=\sigma_i^{-2}+\sigma_j^{-2}$ and $\mu_k \sigma_k^{-2}=\mu_i \sigma_i^{-2}+\mu_j \sigma_j^{-2}$ wherein $G_i \equiv G(y; \mu_i;\sigma_i^2)$; $G_j \equiv G(y;\mu_j,\sigma_j^2)$. Repeated use of the equations above yields $d(y|\Omega)=G(y;\mu,\sigma^2)$, wherein $\mu$ and $\sigma^2$ are calculated from $\sigma^{-2}=\Sigma_{i=1}^{w}\sigma_i^{-2}$ and $\mu\sigma^{-2}=\Sigma_{i=1}^{w}\mu_i\sigma_i^{-2}$. We call this method of merging Gaussians to obtain a PDF from a set of measurements Gaussian merging (GM).

To allow the possibility that $\Omega$ comprises multiple subsets each the manifest of a different true value, we conduct the merging of Gaussians pair-wisely and use a two-sample t-test (for independent samples with equal and known variances) to make clustering decisions. The t-value used is $t(G_i,G_j) \equiv (\mu_i-\mu_j)(\sigma_i^2+\sigma_j^2)^{-1/2}$. The absolute value of $t(G_i,G_j)$ is taken as the distance between $G_i$ and $G_j$. Given a distance threshold $t_0$, we say $G_i$ and $G_j$ are resolvable if $|t(G_i,G_j)| \geq t_0$, in which case the two Gaussians are kept separate, and are unresolvable and merged otherwise. In one embodiment of this invention, a three-step process may be taken to partition $\Omega$ into resolvable subsets: (1) Select distance threshold $t_0$. (2) Identify the unresolvable pair of Gaussians with the smallest $|t|$ and use GM to merge the pair. (3) Iterate step (2) until all remaining pairs are resolvable. This process is a type of hierarchical clustering using $|t|$ as distance and needing no linkage criteria. Error is tracked at each step of clustering and each resultant cluster is associated with a Gaussian for predicting the true value of the cluster. The t-value of each final cluster pair can be used as a quantitative statistic for assessing the reliability of their separation.

Reference will now be made in detail to the present embodiments of the invention, examples of which are illustrated in the accompanying drawings. Wherever possible, the same reference numbers are used in the drawings and the description to refer to the same or like parts.

FIG. 1 is a flowchart of the computer-implemented method for clustering data—an embodiment of the present invention. The computer-implemented method for clustering data 100 comprises the following steps:

Step 130 is taken to obtain a refined dataset. The refined dataset consists of a plurality of refined datums, each of which has a refined mean and a refined variance.

Because the computer-implemented method for clustering data 100 is optimal for data systems of normally distributed errors, refining the raw data (e.g. changing variables) to yield normally distributed errors improves clustering accuracy. Therefore, step 130 may be preceded by step 110, taken to obtain the raw datums, and step 120, taken to refine the raw datums in order to yield normally distributed errors.

Step 150 is taken to calculate a plurality of refined distance values (or called inter-datum distance values) of the refined datum pairs, wherein each of the refined datum pairs is formed by two of the refined datums. Since each of the refined datums is taken as a Gaussian, the t-value, which is used for testing whether the means of two normally distributed populations are equal in statistics, may be utilized to define the refined distance between two refined datums: $|t_{i,j}| = |\mu_i - \mu_j|/\sqrt{\sigma_i^2 + \sigma_j^2}$, wherein $|t_{i,j}|$ is the refined distance between two refined datums i and j, $\mu_i$ and $\mu_j$ are respectively the refined means of the refined datums i and j, and $\sigma_i^2$ and $\sigma_j^2$ are respectively the refined variances of the refined datums i and j.

Step 160 is taken to select the refined datum pair with the least distance value.

At step 180, the selected datum pair selected in step 160 is clustered into a new datum. In other words, the refined datums which form the selected datum pair are clustered into a new datum at step 180. The new datum has a new mean and a new variance which may be calculated using the refined means and the refined variances of the two datums that form the selected datum pair.

For example, the relation that a product of two Gaussians is proportional to another Gaussian may be utilized to calculate the new mean and the new variance of the new datum. Specifically, they may be calculated by using $(\sigma^2)^{-1} = (\sigma_i^2)^{-1} + (\sigma_j^2)^{-1}$ and $\mu\sigma^{-2} = \mu_i\sigma_i^{-2} + \mu_j\sigma_j^{-2}$, wherein $\sigma^2$ is the new variance of the new datum, $\sigma_i^2$ and $\sigma_j^2$ are respectively the refined variances of the refined datums i and j which form the selected refined datum pair, $\mu$ is the new mean of the new datum, and $\mu_i$ and $\mu_j$ are respectively the refined means of the refined datums i and j which form the selected refined datum pair.

At step 190, the two refined datums which form the selected datum pair are replaced by the new datum. The computer-implemented method for clustering data 100 goes back to step 150 to repeat steps 150-190.

In other embodiments, more than one refined datum pair may be selected for clustering at step 160. The number of refined datum pairs to select is not limited in this disclosure.

Before step 180, a distance threshold may be set (step 140) for making clustering decisions (step 170). Wherein, step 170 is taken to determine if the least distance value among the inter-datum distance values is less than the distance threshold for making clustering decisions. If the distance between the two selected datums is below the distance threshold, the selected datums are clustered into a new datum (step 180). Otherwise they are not clustered into a new datum and the clustering process stops (step 200).

At step 210, quantitative statistics is implemented to obtain quantitative statistics from the final datums using the final refined distance values—a measure of the separation reliability of the final refined datums.

As one of its embodiments, the computer-implemented method for clustering data 100 may be utilized to cluster microarray data for analyzing copy number variation. Fluorescent intensities of sample DNA on a first microarray and fluorescent intensities of reference DNA on a second microarray are measured as raw data as in step 110. For step 120, after sorting the microarray probesets by their genomic positions, the logarithm of sample-to-reference intensity ratio (log 2-ratio) of a microarray probeset may be calculated and taken as the refined mean of the refined datum associated with the probeset. More specifically, suppose that the sample DNA is applied to microarray T and the reference DNA is applied to microarray N, and that the fluorescence intensity of the i-th probeset of microarray T is $I_i^T$ and the fluorescence intensity of the i-th probeset of microarray N is $I_i^N$, the refined mean of the refined datum associated with the i-th probeset may be defined as log 2-ratio$_i = \log_2(I_i^T/I_i^N)$. Furthermore, the refined variance of the is refined datum associated with the i-th probeset may be calculated using $\tilde{\sigma}^2 = IQR^2 \times (1.349\sqrt{2})^2$, wherein 1.349 is the interquartile range of $G(y;0,I^2)$, IQR is the interquartile range of q's (or the difference between the 25th and 75th percentiles of the ranked q's), wherein $q_i = \log$ 2-ratio$_{i+1}$ – log 2-ratio$_i$. The datum pairs referred to in step 150 are formed by any two datums whose associated probesets are contiguous in genomic order and are of the same chromosome. Hence, after application of the computer-implemented method for clustering data 100, each of the final refined datums is identified as a segment of same copy number. The distance value between two contiguous resultant refined datums measures the reliability of the breakpoint between the two resultant refined datums.

Above all, normally distributed errors are taken into consideration for clustering. This ensures better accuracy, provides statistical insight that makes formulation simpler and facilitates implementation of quantitative statistics.

A computer-readable medium may be encoded with a computer program to execute the computer-implemented method for clustering data. Suitable to computer-readable media include non-volatile memory (e.g. read-only memory (ROM), programmable read-only memory (PROM), erasable programmable read-only memory (EPROM), and electrically erasable programmable read-only memory (EEPROM) devices), volatile memory (e.g. SRAM, DRAM, and DDR-RAM), optical storage devices (e.g. CD-ROMs and DVD-ROMs) and magnetic storage devices (e.g. hard disk drives and floppy disk drives).

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A computer-implemented method for clustering data, comprising:
   obtaining a refined dataset, wherein the refined dataset comprises a plurality of refined datums, each of the refined datums comprises a refined mean and a refined variance;
   calculating a plurality of refined distance values of a plurality of refined datum pairs, wherein each of the refined datum pairs is formed by two of the refined datums, the refined distance values of the refined datum pairs are calculated using the refined means and the refined variances of the refined datums which form the refined datum pairs;
   selecting one of the refined datum pairs with the least distance value;
   clustering the refined datums, which form the selected refined datum pair, into a new datum; and
   replacing the refined datums, which form the selected refined datum pair, with the new datum.

2. The computer-implemented method for clustering data of claim 1, further comprising:
   obtaining a plurality of raw datums; and
   refining the raw datums into the refined datums which have normally distributed errors.

3. The computer-implemented method for clustering data of claim 1, wherein the refined distance values of the refined datum pairs are calculated as follows: $|t_{i,j}|=|\mu_i-\mu_j|/\sqrt{\sigma_i^2+\sigma_j^2}$, wherein $|t_{i,j}|$ is the refined distance values of the refined datum pair formed by two of the refined datums i and j, $\mu_i$ and $\mu_j$ are the refined means of the refined datums i and j respectively, $\sigma_i^2$ and $\sigma_j^2$ are the refined variances of the refined datums i and j respectively.

4. The computer-implemented method for clustering data of claim 1, wherein clustering the refined datums, which form the selected refined datum pair, into the new datum comprises:
   calculating a new variance of the new datum according to the refined variances of the refined datums which form the selected refined datum pair.

5. The computer-implemented method for clustering data of claim 4, wherein the new variance of the new datum is calculated as follows: $(\sigma^2)^{-1}=(\sigma_i^2)^{-1}+(\sigma_j^2)^{-1}$, wherein $\sigma^2$ is the new variance of the new datum, $\sigma_i^2$ and $\sigma_j^2$ are, respectively, the refined variances of the refined datums i and j which form the selected refined datum pair.

6. The computer-implemented method for clustering data of claim 5, wherein clustering the refined datums, which form the selected refined datum pair, into the new datum further comprises:
   calculating a new mean of the new datum according to the new variance of the new datum and the refined means of the refined datums which form the selected refined datum pair.

7. The computer-implemented method for clustering data of claim 6, wherein the new mean of the new datum is calculated as follows: $\mu(\sigma^2)^{-1}=\mu_i(\sigma_i^2)^{-1}+\mu_j(\sigma_j^2)^{-1}$, wherein $\mu$ is the new mean of the new datum, $\mu_i$ and $\mu_j$ are, respectively, the refined means of the refined datums i and j which form the selected refined datum pair.

8. The computer-implemented method for clustering data of claim 1, further comprises:
   obtaining a distance threshold;
   before clustering the refined datums, which form the selected refined datum pair, into the new datum, determining if the distance value of the selected refined datum pair is less than the distance threshold;
   clustering the refined datums, which form the selected refined datum pair, into the new datum if the distance value of the selected refined datum pair is less than the distance threshold.

9. The computer-implemented method for clustering data of claim 8, further comprises:
   not clustering the refined datums, which form the selected refined datum pair, into the new datum if the distance value of the selected refined datum pair is not less than the distance threshold.

10. The computer-implemented method for clustering data of claim 1, wherein obtaining the refined dataset comprises:
    obtaining log 2-ratios of fluorescent intensities measured by probesets of a first microarray to fluorescent intensities measured by corresponding probesets of a second microarray; and
    taking the obtained log 2-ratios as the refined means of the refined datums of the refined dataset.

11. The computer-implemented method for clustering data of claim 10, wherein the log 2-ratios of the fluorescent intensities measured by the probesets of the first microarray to the fluorescent intensities measured by the corresponding probesets of the second microarray is calculated as follows: log 2-ratio$_i$=log$_2$($I_i^T/I_i^N$), wherein log 2-ratio$_i$ is the log 2-ratio of probeset i, $I_i^T$ and $I_i^N$ are, respectively, the fluorescent intensity measured by probeset i of the first microarray T and the fluorescent intensity measured by probeset i of the second microarray N.

12. The computer-implemented method for clustering data of claim 10, wherein calculating the refined distance values of the refined datum pairs further comprises:
    sorting the refined datums by their genomic positions,
    wherein each of the refined datum pairs is formed by two contiguous refined datums of the same chromosome.

13. The computer-implemented method for clustering data of claim 10, wherein calculating the refined distance values of the refined datum pairs further comprises:
    sorting the refined datums by their genomic positions,
    wherein each of the refined datum pairs is formed by two refined datums of the same exon.

14. The computer-implemented method for clustering data of claim 10, wherein calculating the refined distance values of the refined datum pairs further comprises:
    sorting the refined datums by their genomic positions,
    wherein each of the refined datum pairs is formed by two refined datums of the same promoter region.

15. A computer-readable medium encoded with a computer program to execute a method for clustering data, wherein the method for clustering data comprises:
    obtaining a refined dataset, wherein the refined dataset comprises a plurality of refined datums, each of the refined datums comprises a refined mean and a refined variance;

calculating a plurality of refined distance values of a plurality of refined datum pairs, wherein each of the refined datum pairs is formed by two of the refined datums, the refined distance values of the refined datum pairs are calculated using the refined means and the refined variances of the refined datums which form the refined datum pairs;

selecting one of the refined datum pairs with the least distance value;

clustering the refined datums, which form the selected refined datum pair, into a new datum; and replacing the refined datums, which form the selected refined datum pair, to with the new datum.

16. The computer-readable medium of claim 15, wherein the method for clustering data further comprises:

obtaining a plurality of raw datums; and refining the raw datums into the refined datums which have normally distributed errors.

17. The computer-readable medium of claim 15, wherein the refined distance values of the refined datum pairs are calculated as follows: $|t_{i,j}|=|\mu_i-\mu_j|/\sqrt{\sigma_i^2+\sigma_j^2}$, wherein $|t_{i,j}|$ is the refined distance values of the refined datum pair formed by two of the refined datums i and j, $\mu_i$ and $\mu_j$ are the refined means of the refined datums i and j respectively, $\sigma_i^2$ and $\sigma_j^2$ are the refined variances of the refined datums i and j respectively.

18. The computer-readable medium of claim 15, wherein clustering the refined datums, which form the selected refined datum pair, into the new datum comprises:

calculating a new variance of the new datum according to the refined variances of the refined datums, which form the selected refined datum pair.

19. The computer-readable medium of claim 18, wherein the new variance of the new datum is calculated as follows: $(\sigma^2)^{-1}=(\sigma_i^2)^{-1}+(\sigma_j^2)^{-1}$, wherein $\sigma^2$ is the new variance of the new datum, $\sigma_i^2$ and $\sigma_j^2$ are, respectively, the refined variances of the refined datums i and j which form the selected refined datum pair.

20. The computer-readable medium of claim 19, wherein clustering the refined datums, which form the selected refined datum pair, into the new datum further comprises:

calculating a new mean of the new datum according to the new variance of the new datum and the refined means of the refined datums, which form the selected refined datum pair.

21. The computer-readable medium of claim 20, wherein the new mean of the new datum is calculated as follows: $\mu(\sigma^2)^{-1}=\mu_i(\sigma_i^2)^{-1}+\mu_j(\sigma_j^2)^{-1}$, wherein $\mu$ is the new mean of the new datum, $\mu_i$ and $\mu_j$ are, respectively, the refined means of the refined datums i and j which form the selected refined datum pair.

22. The computer-readable medium of claim 15, wherein the method for clustering data further comprises:

obtaining a distance threshold;

before clustering the refined datums, which form the selected refined datum pair, into the new datum, determining if the distance value of the selected refined datum pair is less than the distance threshold;

clustering the refined datums, which form the selected refined datum pair, into the new datum if the distance value of the selected refined datum pair is less than the distance threshold.

23. The computer-readable medium of claim 22, wherein the method for clustering data further comprises:

not clustering the refined datums, which form the selected refined datum pair, into the new datum if the distance value of the selected refined datum pair is not less than the distance threshold.

24. The computer-readable medium of claim 15, wherein obtaining the refined dataset comprises:

obtaining log 2-ratios of fluorescent intensities measured by probesets of a first microarray to fluorescent intensities measured by corresponding probesets of a second microarray; and taking the obtained log 2-ratios as the refined means of the refined datums of the refined dataset.

25. The computer-readable medium of claim 24, wherein the log 2-ratios of the fluorescent intensities measured by the probesets of the first microarray to the fluorescent intensities measured by the corresponding probesets of the second microarray is calculated as follows: log 2-ratio$_i$=log$_2$($I_i^T/I_i^N$), wherein log 2-ratio is the log 2-ratio of probeset i, $I_i^T$ and $I_i^N$ are, respectively, the fluorescent intensity measured by probeset i of the first microarray T and the fluorescent intensity measured by probeset i of the second microarray N.

26. The computer-readable medium of claim 24, wherein calculating the refined distance values of the refined datum pairs further comprises:

sorting the refined datums by their genomic positions, wherein each of the refined datum pairs is formed by two contiguous refined datums of the same chromosome.

27. The computer-readable medium of claim 24, wherein calculating the refined distance values of the refined datum pairs further comprises:

sorting the refined datums by their genomic positions, wherein each of the refined datum pairs is formed by two refined datums of the same exon.

28. The computer-readable medium of claim 24, wherein calculating the refined distance values of the refined datum pairs further comprises:

sorting the refined datums by their genomic positions, wherein each of the refined datum pairs is formed by two refined datums of the same promoter region.

* * * * *